United States Patent [19]

Pautrot

[11] 4,371,505
[45] Feb. 1, 1983

[54] PROCESS FOR THE RECOVERY OF URANIUM CONTAINED IN AN IMPURE PHOSPHORIC ACID

[75] Inventor: Jean-Marc Pautrot, Neuilly sur Seine, France

[73] Assignee: Rhone-Poulenc Industries, Paris, France

[21] Appl. No.: 125,575

[22] Filed: Feb. 28, 1980

[30] Foreign Application Priority Data

Feb. 28, 1979 [FR] France .............................. 79/05155

[51] Int. Cl.³ .............................................. C01G 43/00
[52] U.S. Cl. ........................................ 423/10; 204/15; 423/8; 423/9
[58] Field of Search ................... 423/8, 10, 9; 204/1.5

[56] References Cited

U.S. PATENT DOCUMENTS

| | | | |
|---|---|---|---|
| 3,616,276 | 10/1971 | Schneider et al. | 423/10 |
| 3,711,591 | 1/1973 | Hurst et al. | 423/10 |
| 3,737,513 | 6/1973 | Wiewiorowski et al. | 423/8 |
| 3,770,612 | 11/1973 | Gray et al. | 204/1.5 |
| 3,966,872 | 6/1976 | Sundar et al. | 423/10 |
| 4,021,313 | 5/1977 | Hausberger et al. | 204/1.5 |
| 4,105,741 | 8/1978 | Wiewiorowski et al. | 423/10 |
| 4,234,393 | 11/1980 | Hepworth et al. | 204/1.5 |
| 4,279,705 | 7/1981 | Riggs | 204/1.5 |

FOREIGN PATENT DOCUMENTS 8552 3/1980 European Pat. Off. ................ 423/8

OTHER PUBLICATIONS

Merritt, "The Extractive Metallurgy of Uranium", pp. 237-239, Colorado School of Mines Research Institute (1971).

Primary Examiner—Edward A. Miller
Attorney, Agent, or Firm—Burns, Doane, Swecker & Mathis

[57] ABSTRACT

The invention concerns a process for the recovery of the uranium contained in an impure phosphoric acid. The impure acid is treated with an organic phase capable of extracting U (VI), and the resultant organic phase is then re-extracted with an aqueous solution containing complexing acid and an oxidizing-reducing agent in the reduced state, said oxidizing-reducing agent being capable of reducing $U^{+6}$ to $U^{+4}$ in said aqueous solution. The resultant aqueous phase is then subjected to electrochemical oxidation, followed by extraction with a second organic phase from which the uranium is recovered, the depleted aqueous solution being recycled to the re-extraction after electrochemical reduction, with the process comprising two organic phase cycles and a cycle of a complexing aqueous solution.

The process is of particular interest when applied to the recovery and concentration of uranium contained in a wet process phosphoric acid.

36 Claims, 3 Drawing Figures

PROCESS FOR THE RECOVERY OF URANIUM CONTAINED IN AN IMPURE PHOSPHORIC ACID

BACKGROUND OF THE INVENTION

1. Field of the Invention

The present invention relates to a process for the recovery of uranium contained in an impure phosphoric acid. More particularly, the invention concerns the concentration and purification of uranium extracted from a wet process phosphoric acid, i.e. from phosphoric acid produced by the acidulation of phosphate rock.

2. Discussion of the Prior Art

Phosphate rock naturally contains small amounts of uranium (from about 50 to 400 p.p.m.). The uranium is dissolved during acidulation of the phosphate rock and remains in the phosphoric acid solution thus produced. Although the concentration of uranium in such solutions is low, the wet-process phosphoric acid is a valuable source of uranium because of the vast quantities of phosphate rock mined each year and processed to recover high-phosphate-containing fertilizer.

A number of attempts have been made in the past to develop commercially feasible methods of recovering uranium from such aqueous solutions. Thus, it is known to recover uranium from aqueous solutions in which it is present in low concentrations, by separating the other potentially usable components of the minerals treated by means of a liquid-liquid extraction assembly and by chemical treatment for the purpose of isolating the uranium and recovering it in the form of a high purity $U_3O_8$ oxide, usable as a source of nuclear fuel. These processes are applicable to the recovery of uranium from minerals such as phosphate rock, which also yields phosphoric acid, and from minerals of various origin containing more or less uranium, which is present most frequently in the form of oxides. The prior art processes generally comprise treatment of the mineral with the aid of a strong and concentrated acid, such as sulfuric, phosphoric, hydrochloric or nitric acid, to provide an aqueous solution containing uranyl ions in a highly dilute state, together with other contaminating ions, from which the uranium is then recovered. A typical example of the treatment of such a solution from a raw, wet process phosphoric acid, obtained by the attack of sulfuric acid on phosphate rocks, is described by F. J. Hurst & D. J. Crouse in *Ind. Eng. Chem. Process Des. Develop.* Vol. 11, No. 1, 1972, pp. 122–128. See also Hurst and Crouse U.S. Pat. No. 3,711,591 and Wiewiorowski et al U.S. Pat. No. 3,737,513 for descriptions of various prior art attempts.

According to the Hurst and Crouse process, the solution in which uranium is found or in which it is transformed to the $U^{+6}$ state, is exposed to a first uranium extraction cycle employing an organic solvent consisting of a mixture of synergistic extractants, namely di(2-ethylhexyl) phosphoric acid (designated HDEHP or D2EHPA) and trioctylphosphine oxide (designated TOPO), diluted in a kerosene-type hydrocarbon. The uranium is extracted from the aqueous solution into the organic solvent in the form of a uranyl complex formed between the uranium (VI) $UO_2^{+2}$ ions and the synergistic mixture of the extractants. The uranium is subsequently recovered from the organic phase into which it has been extracted by means of contact with an aqueous solution of phosphoric acid containing sufficient iron (II) ions to reduce the uranium (VI) to uranium (IV). Because the quadrivalent state is less extractable, the uranium is transferred to the aqueous phase. This aqueous phase is then reoxidized to return the uranium to the uranium (VI) state of oxidation and is then exposed to a second extraction cycle using an organic phase containing a synergistic mixture of the HDEHP-TOPO extractants to obtain finally, after the re-extraction of uranium with an ammonium carbonate solution, a sufficiently pure mixed uranium and ammonium carbonate.

The prior art process described above has a number of disadvantages at the industrial level. Specifically, the reducing re-extraction in the first cycle requires the addition of iron (II) ions in large amounts, the iron (II) ions being obtained by the action of phosphoric acid on iron, which is a slow and difficult reaction, or by means of the introduction of an iron (II) salt, which involves the introduction of an additional anion. In any case, this operating method has the disadvantage of introducing an appreciable amount of iron into the phosphoric acid, which seriously interferes with the second uranium purification cycle downstream. Furthermore, since the second extraction cycle is to be effected on the oxidized aqueous solution, treatment with an oxidizing agent is necessary. Again, there are attendant difficulties. Thus, if the oxidation is performed with air or with air enriched with oxygen, the operation is slow and requires additional equipment. If oxidation is effected by means of a chemical oxidant, it involves the introduction of harmful foreign ions; for example, the introduction of chlorate ions results, after reduction, in the formation of chloride ions, which are powerful corroding agents. The use of hydrogen peroxide (oxygenated water), another possible oxidant, is very expensive.

Furthermore, once the aqueous phase subjected to reductive re-extraction has been reoxidized and depleted of uranium in the second cycle, it is eliminated from the process. Therefore, practically all of the phosphoric acid introduced, the iron and the chemical oxidizing agent are lost in the process. As an example, taking as the basis for calculation a uranium extraction unit corresponding to the treatment of 300,000 tons per year of $P_2O_5$ according to the process described hereinabove, the following estimates ought to be expected:

(a) If ferrous sulfate heptahydrate is chosen as the reducing agent for reasons of low cost and its ready dissolution in phosphoric acid, with the quantity of iron (II) amounting to 28 g per liter of phosphoric acid in the reductive extraction, the daily consumption is of the order of 3.7 tons of ferrous sulfate.$7H_2O$. This poses a problem of storage and supply, rendered even more difficult by the fact that the product is hygroscopic and thus difficult to handle. (The calculation takes into consideration the normal partial reoxidation of iron (II) by air in the mixer-decanters.)

(b) If iron metal solubilized by phosphoric acid is used, the consumption will be of the order of 300 kg per day of metal and bulky equipment for dissolution of the metal will be required.

(c) If hydrogen peroxide is chosen as the means for the reoxidation of the phosphoric acid solution containing the uranium (IV) and the iron (II)/iron (III) couple issuing from the first cycle, prior to its entry into the second extraction cycle, the daily consumption of 70% $H_2O_2$ is of the order of 150 kg.

In addition, once the preceding aqueous phosphoric acid solution is reoxidized, it enters the second cycle, where the solvent effects the total extraction of uranium and a small portion of the iron. The aqueous solution depleted in uranium is then recycled to the phosphoric acid concentration units or to the top of the primary extraction column and the reducing agent is definitely lost for the subsequent reducing extraction of uranium.

Consequently, a real need exists for a commercially feasible process for the recovery of uranium from impure phosphoric acid which will overcome the problems associated with the prior art procedures.

BRIEF SUMMARY OF THE INVENTION

The present invention thus concerns an improved process for the recovery of uranium (VI) contained in an impure phosphoric acid. The continuous process of the present invention comprises three cycles. The first cycle comprises back extraction of an impure phosphoric acid with an organic phase which extracts uranium (VI) without extracting substantial amounts of uranium (IV), followed by separation of the phases; extraction of the resultant organic phase charged with uranium (VI) with an aqueous solution containing an oxidizing-reducing agent in the reduced state, said oxidizing-reducing agent being a reducing agent for uranium (VI) to uranium (IV) in said aqueous solution, followed by separation of the phases; recycling of the resultant organic phase depleted of uranium to the extraction of the phosphoric acid; and treatment of the resultant aqueous solution charged with uranium (IV), to oxidize the uranium (IV) to uranium (VI) and to convert the oxidizing-reducing agent to its oxidized state. The second cycle comprises extraction of the oxidized aqueous solution resulting from the first cycle with an organic phase which extracts uranium (VI), followed by separation of the phases; washing the resultant organic phase charged with uranium (VI) with water and/or an acid, followed by separation of the resultant purified organic phase and recovery of the uranium therefrom, preferably by treatment of the purified organic phase with an aqueous solution containing carbonate ions and ammonium ions, to precipitate ammonium uranyl tricarbonate (AUT) in the aqueous phase, followed by recovery of uranium (VI) therefrom; and recycling of the resultant organic phase depleted of uranium to the second cycle extraction, optionally preceded by regeneration of the organic phase to its extractive form. The third cycle comprises treatment of the aqueous solution resulting from the second extraction of the first cycle in its entirety in the anodic compartment of an electrolytic separation cell under direct current voltage, to afford an aqueous phase containing uranium substantially in the form of U (VI) and the oxidizing-reducing agent in the oxidized state, optionally followed by the addition of a small amount of an oxidizing agent to ensure complete oxidation of the uranium to U (VI) and/or the adjustment of the complexing acid content; treatment of the resultant oxidized aqueous phase with the organic extraction phase of the second cycle; treatment of the resultant aqueous phase depleted of uranium in the cathodic compartment of an electrolytic separation cell under direct current voltage, to afford an aqueous phase containing the oxidizing-reducing agent in the reduced state; and recycling of the resultant aqueous phase to the back extraction of the first cycle, whereby the aqueous solution is circulated in a closed loop between the first and second cycles, in the form of a third cycle.

The process of the present invention thus provides a characteristic third cycle, between the first and second cycles, for treatment of the re-extraction aqueous phase containing iron and uranium values by successive electrolytic oxidation and reduction, resulting in a very low iron consumption and also in very low consumption of oxidizing agent, which in turn result in considerable cost savings when the process is employed on a commercial scale.

DETAILED DESCRIPTION OF THE PREFERRED EMBODIMENTS

Figure 1:
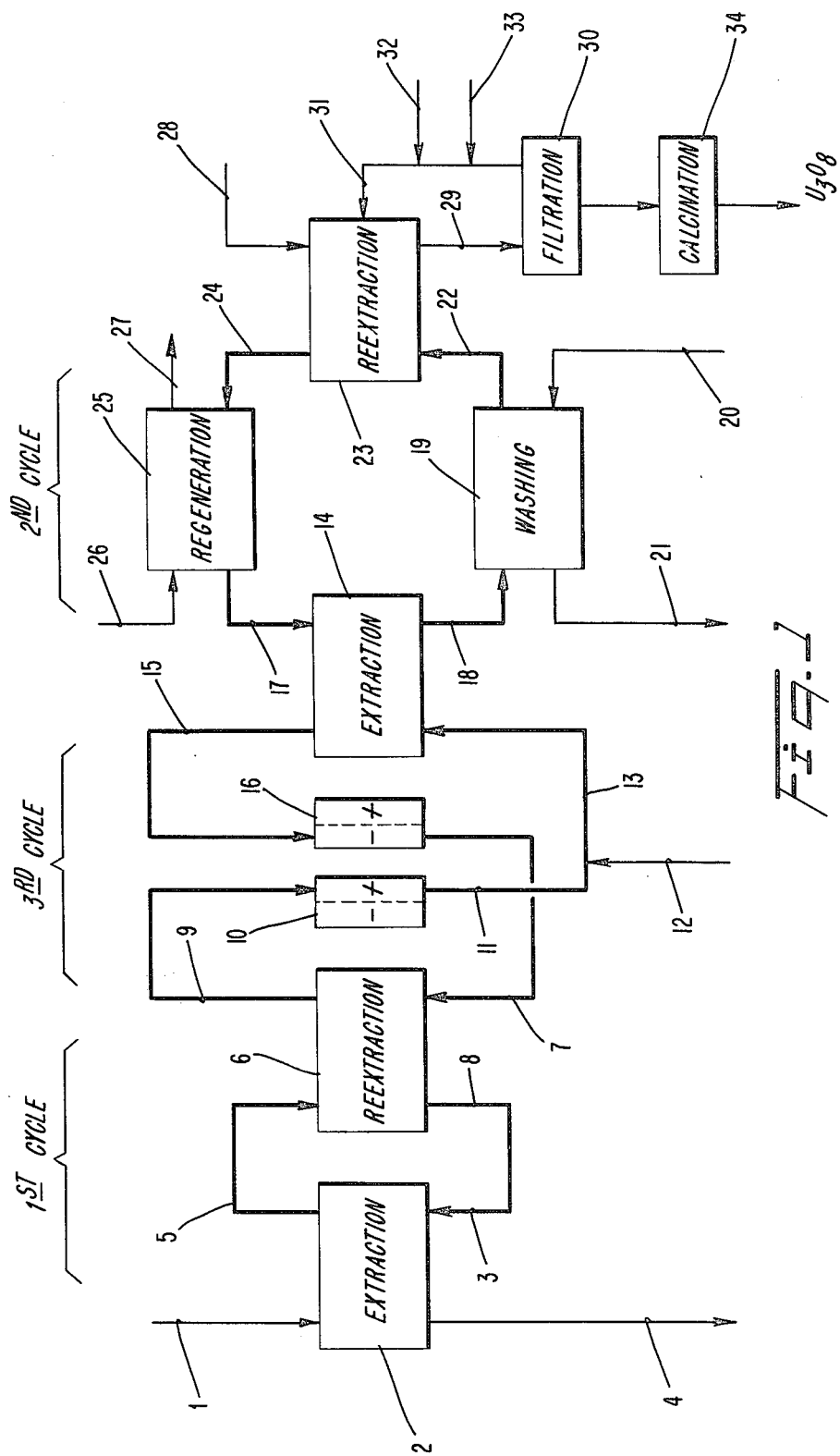
FIG. 1 is a schematic diagram of a principal mode of embodiment of the invention.

According to the invention, the initial phosphoric acid is typically represented by a raw wet process phosphoric acid obtained by the action of sulfuric acid on phosphate rocks, after filtration, possibly also after a clarification and stabilization treatment vis-a-vis organic and mineral impurities, and containing uranium in the $+6$ oxidation state.

In the first cycle according to the invention, the above-described phosphoric acid is exposed to extraction using an organic phase for extracting U (VI). The organic extraction phase of this first cycle contains an extracting agent for uranium (VI), which, however, extracts few uranium (IV) ions. This type of extractant is well known in the art. Suitable extractants include cationic extractants, among which the following may be cited as examples, but without limiting the group: select monoalkylphosphoric acids, dialkylphosphoric acids, alkylphosphoric acids, alkylphenylphosphoric acids, alkylphosphinic acids, and alkylpyrophosphoric acids, used individually or in mixtures, wherein the alkyl chains generally contain 4 to 10 carbon atoms. Alternatively, the extractant as defined above may be associated with a known synergistic extraction agent, such as, for example, the alkylphosphates, alkylphosphonates, alkylphosphinates or trialkylphosphine oxides, wherein the alkyl chains generally contain 4 to 10 carbon atoms. Among synergistic couples well suited to the extraction of uranium from phosphoric acid, the mixture of di(2-ethylhexyl)phosphoric acid with trioctylphosphine oxide, may be mentioned as an example. The extractant may further contain anionic extractants, such as certain secondary or tertiary alkylamines which are insoluble in water, and certain known extracting agents which are of a neutral character and which are also immiscible in water, such as trialkyl phosphates.

The organic extraction phase can optionally contain an organic diluent which is inert with respect to the extractants, so as to improve the hydrodynamic properties of the organic phase. Numerous organic solvents or their mixtures may be used as diluents, for example aliphatic hydrocarbons such as kerosene, aromatic hydrocarbons, halogenated hydrocarbons, petroleum ethers and the like. In general, the characteristics of the diluent are not critical, although select diluents offer certain advantages under particular conditions of utilization.

The concentration of the extracting agent in the diluent may vary within large limits, i.e. between about 0.05 mole and the pure extractant. However, from a practical point of view, extractant solutions comprising between 0.1 and 2 molar, are generally employed. In the case where an extractant is used together with a synergistic extracting agent, the solution will usually be 0.1 to 2 molar in the extractant and 0.01 to 2 molar in the synergistic agent.

The extraction of the initial phosphoric acid is effected in the conventional manner in a liquid-liquid contact apparatus. For example, the extraction may be performed in mixer-decanters, or packed, pulsating or empty columns, the contact being either co-current or counter-current. The temperature is not critical and may vary between 20° C. and 80° C., a preferred temperature being around 50° C.

The ratio of the flow rates of the organic extraction phase to the initial acid is not critical. However, it is usually between 0.2 and 5.

Following the separation of the phases, the organic phase contains uranium in the +6 oxidation state, as the result of the conditions of the generation of this solution. It also contains other chemical species, depending on the conditions of preparation. Specifically, in the case of solutions obtained by the liquid-liquid extraction of a raw, wet process phosphoric acid, the solutions usually contain phosphoric acid and other anions and cations of metals such as Al, Fe, Ti, V, etc., in low concentrations. The uranium concentration of the organic phase is generally between 20 and 3000 mg, expressed as uranium metal per liter of the phase, preferably between 50 and 500 mg per liter.

In the second stage of the first cycle, the organic phase charged with U (VI) which results from the first stage is then contacted with an aqueous re-extraction phase which is part of the third cycle of the invention.

The aqueous solution which is placed in contact with the above-mentioned organic phase generally contains a strong and complexing acid, such as phosphoric or hydrochloric acid, and possibly other acids and their mixtures, provided that the presence of the acids does not lead to the precipitation of uranium. The aqueous solution also contains an oxidizing-reducing agent capable of reducing uranium (VI) to uranium (IV), said agent being in the reduced state. The electrochemical potential of the oxidizing-reducing couple mentioned hereinabove in the aqueous solution under consideration is such that it is lower than that of the uranium (VI)-uranium (IV) couple in said solution. A representative oxidizing-reducing couple is an iron (III)/iron (II) couple. Thus, when an iron (III)/iron (II) couple is used, the aqueous solution contains iron in the +2 oxidation state. In order to displace the equilibrium of the reaction between the $U^{+6}$ ions and the $Fe^{+2}$ ions on the one hand, and the $U^{+4}$ and $Fe^{+3}$ ions on the other, in a direction favorable to the production of $U^{+4}$ ions, the solution must contain a significant excess of iron (II) ions with respect to the uranium ions. The concentration of the strong acid in the solution may vary between wide limits. However, in actual practice, in order to obtain the maximum depletion of uranium in the organic solution, the concentration will be selected as a function of the specific phases used and of the temperature. In the case wherein the strong and complexing acid of the aqueous solution is phosphoric acid, its concentration in the solution should be between 18 and 70%, preferably higher than 28% by weight of $P_2O_5$. The solution may also contain iron ions in the +3 oxidation state, in which case the ratio of the concentration in iron (II) ions to the concentration of iron (III) ions may vary between very broad limits. In actual practice, a ratio of $Fe^{+2}$ to $Fe^{+3}$ in excess of 0.1 is usually indicated, although preferably the ratio of $Fe^{+2}$ to $Fe^{+3}$ should be higher than 2.

The organic phase containing uranium in the +6 oxidation state and the aqueous solution described hereinabove are contacted with each other in conventional liquid-liquid extraction equipment. The contacting may be effected in mixer-decanters, in packed, pulsating or empty columns, or in any other suitable apparatus, the contact being concurrent or countercurrent. The temperature during the contacting is not critical, but for practical reasons temperatures between 20° C. and 80° C., preferably in the vicinity of 50° C., are preferred.

The ratio of the flow rate of the organic phase to that of the extracting aqueous solution entering the contact zone is not critical; however, the ratio should be maintained as high as possible in order to recover uranium in the form of a concentrated solution. A flow ratio of organic phase to aqueous solution of between 20 and 60 leads to the best results. This range of values does not, however, take into account possible internal recycling within the extraction zone.

In the course of the contacting operation, it is thought that the equilibrium of the partition of uranium (VI) between the organic phase and the aqueous solution is established rapidly, while the reduction of uranium (VI) in the aqueous solution by the reducing agent is slow. Knowledge of the kinetics of the reduction and the isotherms of the partition of $U^{+6}$ and $U^{+4}$ between the two phases permits the control of the different parameters of the contacting operation to obtain maximum extraction results.

After the above contacting, followed by separation of the phases, the organic phase depleted in uranium is recycled to the extraction of the initial phosphoric acid in the form of a circulating loop, which constitutes the first cycle of the invention.

The aqueous phase issuing, after separation, from the contact zone and containing the $U^{+4}$ ions and the oxidizing-reducing agent in a partially oxidized state, feeds in its entirety the anodic compartment of an electrolytic separator cell under a direct current voltage, from which an aqueous phase containing uranium substantially in the form of U (VI) and the oxidizing-reducing agent in the oxidized state are recovered.

The electrolytic cells used in practicing the process of the present invention are well-known separator cells. As the separator, a porous material such as a ceramic or a plastic material rendered porous by sintering or by the introduction of a porogen agent, or an ion exchange membrane, may be used. A preferred separator is a cation exchange membrane, preferably consisting of a perfluorated polymer with sulfonic acid groups. The anodes generally consist of graphite or a metal coated with an electroactive layer. The cathodes may consist of different metals, for example, platinum, lead or their alloys. The configuration of the cells is generally of the flat type, with a large electrode surface and a narrow space between the electrodes. In a preferred form of industrial embodiment, a battery of electrolytic elements mounted in series in a well-known multicell device of the filter press type is used. In this form of embodiment, the input of the cathodic compartments may be effected in parallel or in series, so as to control the flow of liquid into each of the elements. In order to facilitate the desired electrochemical reactions, it may be advantageous to increase the active surface of the electrodes or to cause vigorous agitation of the solutions by means of a set of baffles. Similarly, the feeding of the anodic compartments may be of series or of parallel type. Furthermore, in order to equalize the pressures of the two compartments, the anodic and cathodic compartments may comprise means to recycle the exiting solution.

In a particular embodiment of the present invention, anodic and cathodic compartments may be grouped in a single twin-operated electrolytic separator cell, as described in copending Nenner et al U.S. Patent application Ser. No. 65,504, filed Aug. 10, 1979, assigned to the assignee hereof and hereby incorporated by reference in its entirety and relied upon.

The aqueous phase issuing from the anodic compartment of the electrolytic cell contains uranium, substantially all of which is in the +6 oxidation state, i.e. its $U^{+6}$ content is at least 85% of the total uranium content. In order to continue the treatment of said phase containing uranium only in the U (VI) state, it would be possible to complete the oxidation of the uranium by a small addition of a chemical oxidizing agent, such as hydrogen peroxide, or by the action of air or oxygen, possibly under elevated pressure.

The aqueous phase resulting from the preceding treatments is then exposed to treatment with an organic extraction phase of the same nature as that of the first cycle in a liquid-liquid exchange apparatus such as that described hereinabove, optionally cooled to facilitate the operation, whereby an aqueous phase depleted in uranium and an organic phase charged with uranium are obtained. The ratio of the flow rate of the aqueous solution of the third cycle to the flow rate of the organic solution is usually between 0.2 and 3. The depleted aqueous solution is then fed in its entirety or in part to the cathodic compartment of an electrolytic separator cell under direct current voltage, whereby the reducing form of the oxidizing-reducing agent is substantially regenerated. Subsequently, the aqueous phase is again introduced into the preceding phase of contacting and re-extraction of the organic extraction phase which are part of the first cycle. The aqueous solution of the complexing acid and the reducing-oxidizing agent thus circulates in a closed loop comprising two contactings with an organic extraction phase and the passage into the anodic compartment and into the cathodic compartment of electrolytic separator cells under a direct current voltage, the loop constituting the third cycle of the present invention.

The organic extraction phase resulting from the second cycle extraction and charged with uranium may, after separation, be washed with water or an acid solution in order to reduce the complexing acid content. Subsequently, the purified organic phase is exposed to a treatment for regeneration according to known processes.

Thus, the organic phase charged with uranium may be treated with an aqueous solution containing ammonium and carbonate ions, whereby ammonium uranyl tricarbonate (AUT) is precipitated into the aqueous phase. After phase separation, the aqueous phase is filtered and then the precipitate is calcined to yield $U_3O_8$. The resulting organic extraction phase, depleted in uranium, is then recycled to the preceding extraction stage for extraction of the aqueous phase of the third cycle, after having been exposed to a washing stage with water or after treatment with an acid necessary to regenerate the acid form of the extractant in the case where the organic phase comprises a cationic extractant. The organic extraction phase in fact circulates in the form of a closed loop, which constitutes the second cycle of the present invention.

The invention applies especially well to the particular case wherein the oxidizing-reducing couple is the iron (III)/iron (II) couple and the aqueous solution that is part of the third cycle of the process is an aqueous solution of phosphoric acid. Then, part of the iron (III) contained in the organic phase of the first cycle and originating from the extraction by said organic phase of a part of the iron (III) contained naturally in wet process phosphoric acid, may be re-extracted by the aqueous solution of phosphoric acid constituting the third cycle of the process. For the same reason, part of the iron (III) contained in the latter is re-extracted by the organic phase constituting the second cycle of the process.

In order to maintain an essentially constant overall concentration of iron in the aqueous solution of phosphoric acid in the third cycle, it is appropriate to equalize the amount of iron re-extracted from the organic phase constituting the first cycle, with that extracted by the organic phase of the second cycle, which is readily accomplished by controlling the efficiency of the reduction of iron (III) to iron (II) by the cathodic compartments of the electrolytic cells located in the loop forming the third cycle. It is then possible to eliminate all additions of iron without adversely affecting the operation of the process.

Another variation of the present invention is one wherein it is desired to further effect a washing of the organic phase constituting the second cycle of the process by a small flow of phosphoric acid free of iron, for the purpose of substantially lowering the iron content in said organic phase. The organic extraction phase, charged with uranium, after separation, is exposed to a first washing with a small flow of an aqueous solution of phosphoric acid free of iron (i.e. containing preferably less that 50 mg/l iron) and preferably having a $P_2O_5$ content close to that of the aqueous solution of phosphoric acid circulating in the third cycle of the process, in a liquid-liquid exchange apparatus. The organic phase substantially purified of iron in this manner may then be exposed to a second washing with water or with an acid solution in order to reduce its complexing acid content, and is then treated according to the process described hereinabove.

The aqueous phosphoric acid solution resulting, after separation, from the first washing operation may be judiciously combined with the aqueous phosphoric acid solution constituting the third cycle of the process at or before the point at which it feeds the apparatus for the extraction of uranium by the organic phase in the second cycle. The resulting aqueous solution, after depletion of uranium and prior to its passage into the cathodic compartment of the electrolytic cell, is exposed to cleansing at a rate equal to that of the phosphoric acid used in the above-described first washing. As in the previous case, in order to maintain an essentially constant concentration of iron in the aqueous phosphoric acid solution constituting the third cycle, it is appropriate to equalize the amount of iron re-extracted from the organic phase constituting the first cycle with that removed by this purge; this is readily accomplished by controlling the efficiency of the reduction of iron (III) to iron (II) in the cathodic compartment of the electrolytic separator cell under direct voltage in the third cycle.

The invention will be better to understand by referring to the accompanying drawings, discussed in detail below.

Referring to FIG. 1, which represents an application of the invention to a raw wet process phosphoric acid, the raw acid, optionally after stabilization, is introduced through line 1 into an extraction apparatus 2 where it is contacted with the organic extraction phase of the first cycle entering via line 3. From the apparatus 2, a depleted raw acid issues through 4 and is used in other applications. The organic phase exiting via line 5, charged with uranium, then feeds the re-extraction apparatus 6, where it is placed in contact with the aqueous solution of the complexing acid and the oxidizing-reducing agent entering via line 7. The depleted organic phase exits through line 8 and again feeds, in a closed loop, the first extraction apparatus 2. The aqueous phase exiting though line 9 feeds the anodic compartment of an electrolytic separator cell 10 under direct current voltage from which it exits in the oxidized state via line 11; subsequently, it may be treated by the flow 12 of an additional oxidizing agent, the resulting flow 13 feeding the extraction apparatus 14. The aqueous flow 15, depleted in uranium, which leaves the extraction apparatus 14, supplies the cathodic compartment of an electrolytic separator cell 16 under direct current voltage and then again feeds the re-extraction apparatus 6 in the form of a closed circulation loop.

The extraction apparatus 14 is also fed through line 17 with the organic extraction phase of the second cycle. The organic phase issues through line 18 charged with uranium and feeds a wash battery 19 wherein the organic phase is washed in counter-current manner by the water entering through line 20, the wash water exiting from battery 19 through line 21. The washed organic phase exits through line 22 and supplies a re-extraction apparatus 23 from which it issues through line 24 depleted of uranium. Subsequently, line 24 supplies a regeneration apparatus 25 where the depleted organic phase is washed in one or more stages by means of a dilute aqueous acid solution entering through line 26. The organic extraction phase just regenerated again supplies the extraction apparatus 14 through line 17. The acid wash solution exiting through line 27 may be utilized in one or more stages of the manufacture of the initial phosphoric acid. The re-extraction apparatus 23 is fed by an aqueous flow 28 containing carbonate ions and ammonium, resulting in precipitation of ammonium uranyl tricarbonate (AUT). The resulting aqueous AUT suspension exits from apparatus 23 by means of line 29 and is filtered at 30, the liquors being recycled through line 31, following the addition of carbonate ions and ammonium through lines 33 and 32, respectively. The filter cake is washed, if desired, and then calcined at 34 to yield $U_3O_8$, the desired product.

Illustrative examples of the present invention are set forth below.

EXAMPLE 1

This example illustrates the mode of embodiment of FIG. 1.

A raw wet process phosphoric acid is introduced via line 1, said acid having been exposed to a pretreatment of organic and mineral matter stabilization and containing 30% by weight of $P_2O_5$ and 100 mg/l of uranium (VI), said acid flowing at a rate of 96 m$^3$/h. The flow feeds the extractor 2 consisting of an agitated column wherein a solution which is 0.5 molar in di-(2-ethylhexyl)phosphoric acid and 0.125 molar in trioctylphosphine oxide in kerosene is introduced at a rate of 48 m$^3$/h, the entire assembly operating at 50° C. The organic phase 5 charged with uranium feeds the re-extraction apparatus 6, maintained at 55° C. and comprising three mixer-decanters, wherein said organic phase is contacted with an aqueous solution 7 containing

[i] 30% by weight of $P_2O_5$
[ii] 23.6 g/l iron (II) ions
[iii] 6.1 g/l iron (III) ions
and flowing at a rate of 1.3 m$^3$/h.

The organic flow 8 exiting the re-extraction apparatus 6 is recycled into the extraction apparatus 2. The aqueous flow 9 exiting the re-extraction apparatus feeds the seven anodic compartments of a battery of electrolytic cells 10, said cells having a perfluorated sulfonic polymer membrane. These compartments, measuring 1×1 m, comprise flat graphite electrodes and are equipped with staggered baffles extending the path of the electrolyte and increasing its velocity. The anode-membrane distance is 5 mm. In the seven corresponding cathodic compartments, phosphoric acid containing 30% $P_2O_5$ circulates at a rate of 1.8 m$^3$/h, from which hydrogen is released. The flat electrodes, made of Incoloy, are at a distance of 5 mm from the membrane. A direct current of 6800 amperes is applied to the cell, with the voltage on the terminals amounting to 2.9 volts. The aqueous flow 11 issuing from the anodic compartments receives a 70% by weight hydrogen peroxide solution through line 12 at a rate of 0.19 kg/h. The resulting flow 13, containing 7 g/l uranium (VI) and 30 g/l iron (III), supplies the extraction apparatus 14 consisting of six mixer-decanters maintained at 30° C. The aqueous flow leaves apparatus 14 via line 15, to in turn feed the fifteen cathodic compartments of a battery of electroytic cells 16 having membranes of a perfluorated sulfonic polymer. These compartments, measuring 1×1 m, comprise flat electrodes made of lead and are equipped with staggered baffles extending the path of the electrolyte and increasing its velocity. The cathode-membrane distance is 5 mm. In the corresponding fifteen anodic departments phosphoric acid containing 30% $P_2O_5$, circulates at a rate of 1.8 m$^3$/h, from which oxygen is released. The flat electrodes, platinum-ruthenium on titanium, are at a distance of 5 mm from the membrane. A direct current of 14,700 amperes is applied to the cell, establishing a voltage of 2.9 volts on the terminals. The aqueous flow 7 issuing from the cathodic compartments subsequently feeds the apparatus 6.

Into apparatus 14 there is also introduced through line 17 a flow of 2.1 m$^3$/h of an organic extraction phase which is 0.3 molar in HDEHP and 0.075 molar in TOPO in kerosene. The organic phase leaves via line 18 and feeds the wash battery 19 comprising three mixer-decanters, where it is washed by a flow of 0.21 m$^3$/h water. The aqueous phase exits via line 21 in the form of a highly dilute solution of phosphoric acid containing 0.75% $P_2O_5$. The washed organic phase exits via line 22 and supplies the re-extraction apparatus 23 consisting of two mixer-decanters, where it is contacted with an aqueous solution of ammonium carbonate (0.5 molar) having a flow rate of 100 l/h and an aqueous solution of ammonium carbonate of 2 moles per liter having a flow rate of 4.2 m$^3$/h. The organic phase 24 depleted in uranium undergoes regeneration in the apparatus 25, consisting of a mixer-decanter, by means of an aqueous solution 26 of sulfuric acid with a concentration of 25% by weight and a flow rate of 2.1 m³/h. A wash solution is recovered via line 27 at a rate of 2.2 m³/h and containing 10.7 kg NH₃/h.

The aqueous suspension of AUT exits the re-extraction apparatus via line 29 and is filtered at 30. The liquor is recycled through line 31 and the cake is calcined at 34 to yield $U_3O_8$.

The daily consumption necessary for the treatment of a unit of 300000 tons per year of phosphoric acid expressed in $P_2O_5$ are as follows:
[i] iron: none
[ii] hydrogen peroxide, 70% concentration, based on a yield of the electrolytic oxidation of uranium of 90%: 4.5 kg
[iii] electric power: 1500 kWh.

As a variant of the preceding example, it is possible to use a single battery of electrolytic separator cells of the type described in copending Nenner et al U.S. Ser. No. 65,504. The flow 9 then supplies the fifteen anodic compartments of this battery, and the flow 15 supplies the fifteen cathodic compartments. These compartments, measuring 1×1 m, are separated by a membrane made of perfluorated sulfonic polymers, the electrode-membrane distance being 5 mm. A direct current of 15000 amperes is applied to the cell, establishing a voltage at the terminals of 2.9 volts.

The daily consumption of electric power is reduced to 1020 kWh.

COMPARATIVE EXAMPLE

The process of this example is an embodiment of the prior art Hurst and Crouse process.

Figure 2:
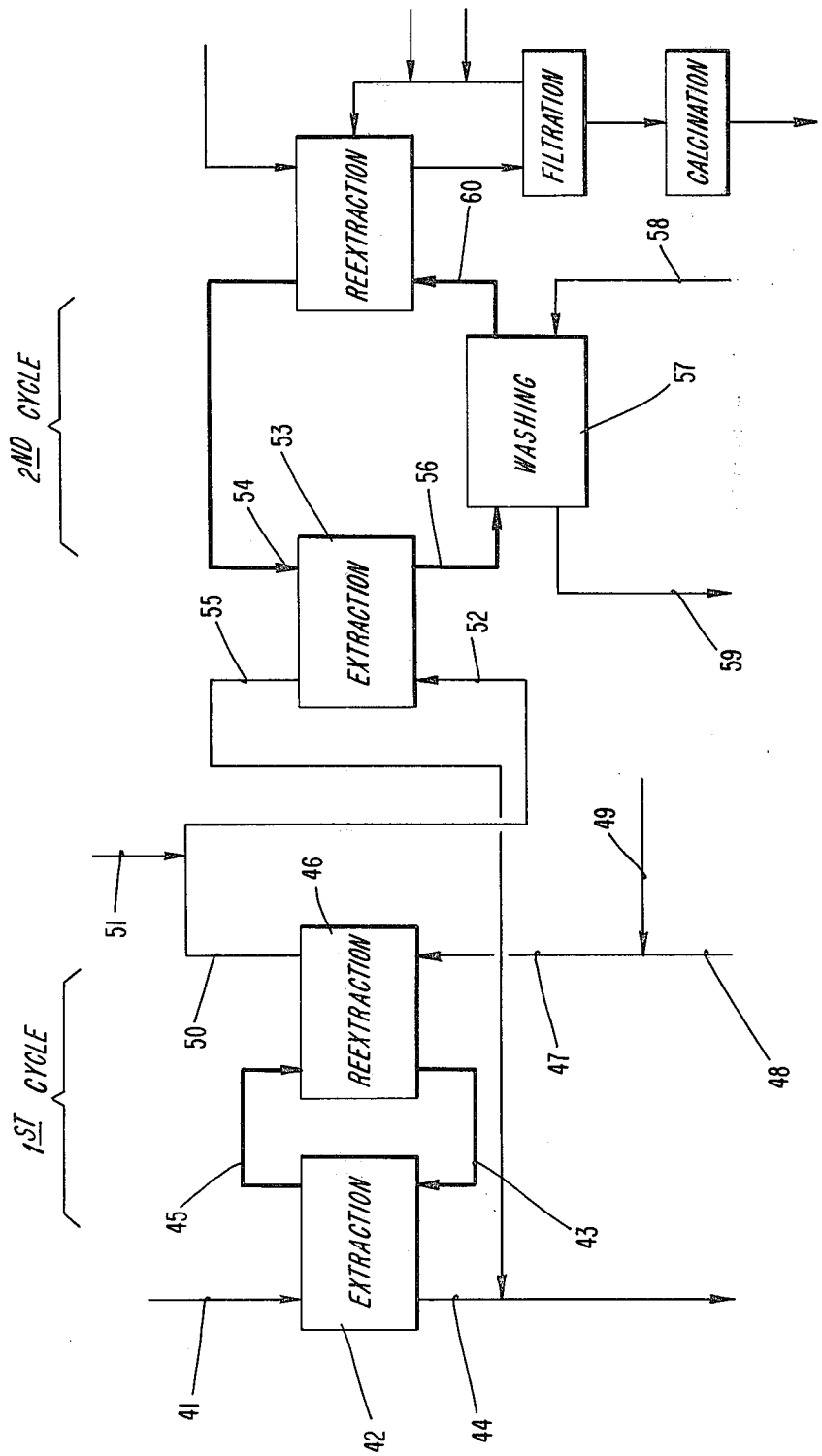
FIG. 2 is a schematic diagram of a mode of embodiment of the prior art Hurst and Crouse process.

The same raw wet process acid, yielding a unit of 300000 tons per year in $P_2O_5$, is treated in accordance with the diagram of FIG. 2 comprising certain apparatus of FIG. 1, unless otherwise indicated.

The raw acid is fed through line 41 at a flow rate of 96 m³/h to the extraction column 42, where it is contacted with the same organic phase as in Example 1, entering via line 43 at a rate of 48 m³/h. After separation, the organic phase feeds the re-extraction apparatus 46 via line 45. Apparatus 46 is identical to apparatus 6 of FIG. 1. In apparatus 46, the organic phase is contacted with an aqueous solution entering through line 47 at a rate of 1.3 m³/h and consisting of a flow of 1.23 m³/h of phosphoric acid 48 with 32.7% by weight of $P_2O_5$, to which is added 153 kg/h of ferrous sulfate heptahydrate 49. The organic phase exiting from 46 via 43 feeds apparatus 42. The exiting aqueous flow 50 receives via line 51 a flow of 70% hydrogen peroxide at a rate of 6.4 kg/h, then feeds the extraction apparatus 53, which is identical to 14 of FIG. 1. The depleted aqueous solution issuing via line 55 is combined with the depleted acid in line 44 and subsequently passed to phosphoric acid concentration units. The organic phase entering the apparatus 53 via line 54 is identical with the phase in line 17 of Example 1 and flows at a rate of 2.1 m³/h. At the outlet of apparatus 53, the organic phase exiting via line 56 is washed in 57, which is identical to 19 of Example 1, with water at a flow rate of 0.21 m³/h. The wash solution of dilute phosphoric acid exits via line 59. The end of the treatment is identical with that of Example 1.

The daily consumptions for a unit of the same capacity as in Example 1 are the following:
[i] iron: in the form of ferrous sulfate heptahydrate: 3670 kg
[ii] hydrogen peroxide at a 70% concentration: 154 kg
[iii] $P_2O_5$: 13 tons.

EXAMPLE 2

Figure 3:
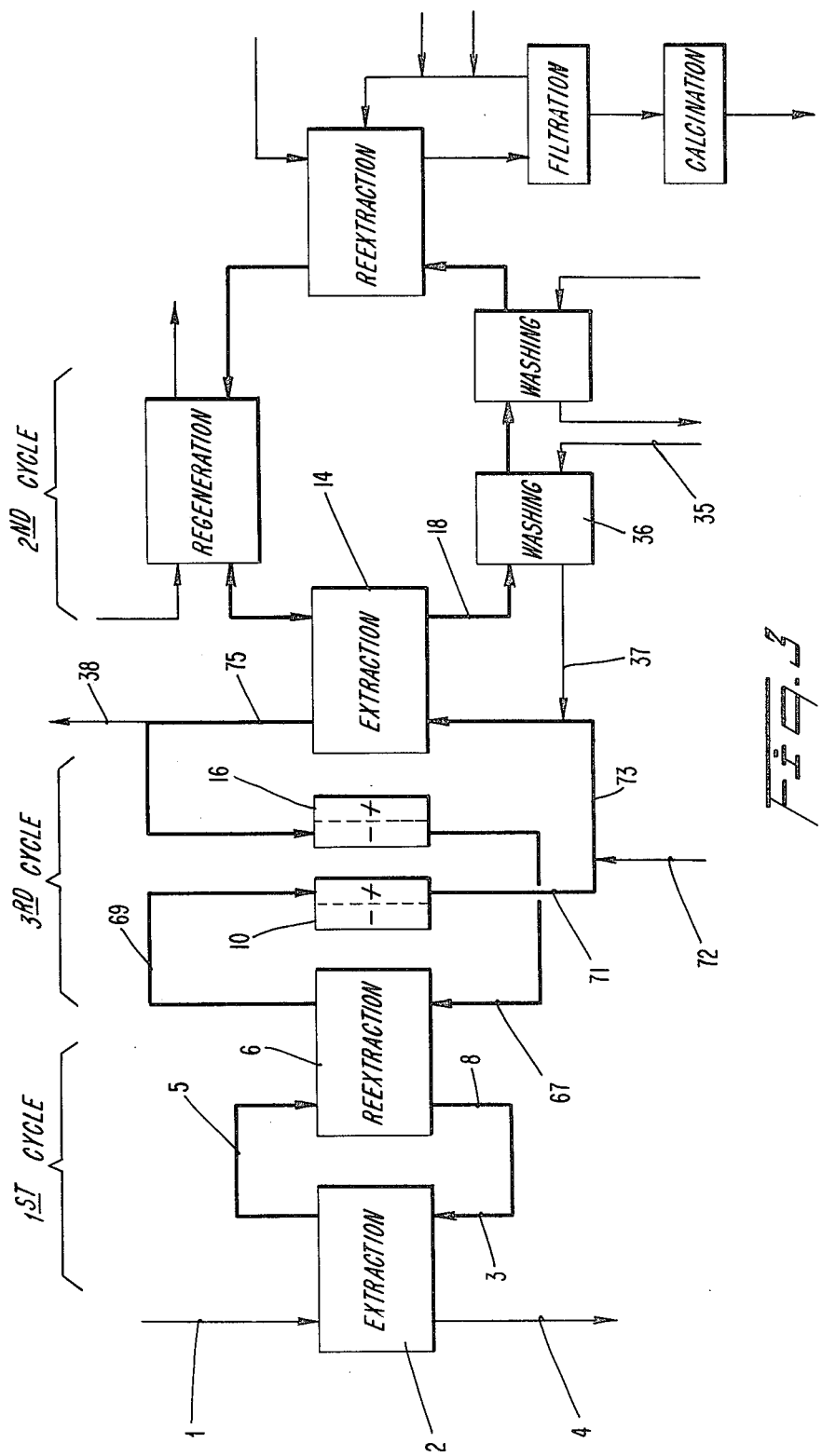
FIG. 3 is a schematic diagram of an alternate mode of embodiment of the invention.

A variation of the invention is illustrated in FIG. 3; this variation differs from that of FIG. 1 in that the organic phase 18 coming from the extraction apparatus 14 is contacted in apparatus 36 with a flow of phosphoric acid free of iron, entering via line 35, to effect a first washing. The resulting phosphoric acid solution 37 is combined with the flow 73 to supply the extraction apparatus 14. The aqueous phase 75, depleted of uranium, feeds in part the cathodic compartments of the battery of cells 16 of the same construction as those of Example 1, while the other part of the aqueous phase exits via line 38 and may be reused at one or more points of the phosphoric acid process.

The first stages of the process are identical with those of Example 1. The organic phase 5, charged with uranium (VI), feeds the re-extraction apparatus 6, maintained at 55° C. and comprising three mixer-decanters, where it is contacted with an aqueous solution 67 containing:
[i] 30% by weight $P_2O_5$
[ii] 21.9% g/l iron (II) ions
[iii] 2.5 g/l iron (III) ions
and flowing at a rate of 1.3 m³/h.

The resultant aqueous flow 69 feeds the anodic compartments of a battery of cells 10 having the construction of those of Example 1, from which it issues via line 71. To flow 71, a flow 72 of 70% hydrogen peroxide is added at a rate of 0.19 kg/h. The resulting flow 73, containing 7 kg/m³ of uranium (VI) and 30 kg/m³ of iron (III), is combined with the flow 37 coming from the washing apparatus 36 which consists of a battery of 6 mixer-decanters, and the combined aqueous flows supply the extraction apparatus 14, maintained at 30° C. The aqueous phase exits from apparatus 14 via line 75. One portion of flow 75 is diverted as a flow 38, which has a flow rate of 0.3 m³/h and contains 24.4 kg/m³ iron (III), while the other portion supplies the cathodic compartments of a battery of cells 16, having the same construction of those of Example 1. The aqueous phase issues from the cathodic compartments in a substantially reduced state and is then introduced in the re-extraction apparatus 6. To the terminals of cell 10 an intensity of 6800 amperes and to the terminals of cell 16 an intensity of 13600 amperes, are applied. In both cases, the voltage is established at 2.9 volts.

It is thus seen that the daily consumptions for a treatment unit of the same capacity as in Example 1 are the following:
[i] iron: none
[ii] 70% hydrogen peroxide, based on electrolytic oxidation yield of uranium of 90%: 4.5 kg
[iii] electric power: 1420 kWh As a further variation, it is also possible to use a single battery of electrolytic separator cells of the design of that described at the end of Example 1 (i.e. the type of twin-operated electrolytic cell used in Nenner et al U.S. Ser. No. 65,504.) An intensity of 13600 amperes is applied to the terminals, with the voltage amounting to 2.9 volts.

The daily consumption of electric power is then reduced to 950 kWh.

While the invention has been illustrated in the drawings and described in the examples in terms of various preferred embodiments, the skilled artisan will appreci-

What is claimed is:

1. In a continuous process for the recovery of uranium (VI) contained in an impure phosphoric acid comprising:
   (a) a first cycle comprising (i) extracting an impure phosphoric acid with an organic phase which extracts uranium (VI) without extracting substantial amounts of uranium (IV), followed by separating the phases; (ii) extracting the resultant organic phase charged with uranium (VI) with an aqueous solution containing an oxidizing-reducing agent in the reduced state, said oxidizing-reducing agent being a reducing agent for uranium (VI) to uranium (IV) in said aqueous solution and comprising iron (II) ions, said aqueous solution being a solution of phosphoric acid and the phosphoric acid concentration of said aqueous solution being between about 18% and about 70% by weight of $P_2O_5$, followed by separating the phases; (iii) recycling the resultant organic phase depleted of uranium to the extracting of the impure phosphoric acid; and (iv) treating the resultant aqueous solution charged with uranium (IV), to oxidize the uranium (IV) to uranium (VI) and to convert the oxidizing-reducing agent to its oxidized state; and
   (b) a second cycle comprising (i) extracting the oxidized aqueous solution resulting from the first cycle with an organic phase which extracts uranium (VI), followed by separating the phases; (ii) washing the resultant organic phase charged with uranium (VI) with a phosphoric acid solution free of iron, the concentration of the phosphoric acid in the washing solution being close to that of the aqueous extracting solution employed in step (ii) of the first cycle, followed by separating the resultant purified organic phase, treating said purified organic phase with an aqueous solution containing carbonate and ammonium ions to precipitate the uranium in said solution in the form of ammonium uranyl tricarbonate, separating the depleted organic phase from the aqueous suspension and recovering the uranium from said aqueous suspension in the form of ammonium uranyl tricarbonate; and (iii) regenerating and then recycling the resultant organic phase depleted of uranium to the second cycle extracting step; the improvement comprising:
   (i) carrying out step (iv) of the first cycle by treating the aqueous solution charged with uranium (IV) resulting from the extracting step (ii) of the first cycle in its entirety in the anodic compartment of an electrolytic cell under direct current voltage;
   (ii) carrying out step (i) of the second cycle by treating the oxidized aqueous phase issuing from and anodic compartment with the organic extracting phase of the second cycle;
   (iii) treating the resultant aqueous phase depleted of uranium in its entirety in the cathodic compartment of said electrolytic separation cell under direct current voltage, to afford an aqueous phase containing the oxidizing-reducing agent in the reduced state; and
   (iv) recycling the resultant aqueous phase to the back extracting step of the first cycle;
   whereby the aqueous solution is circulated in a closed loop between the first and second cycles, in the form of a third cycle.

2. The process of claim 1 wherein, in the third cycle, the oxidized aqueous phase is treated with a small quantity of oxidizing agent to complete the oxidation of U(IV) to U(VI) prior to treating said oxidized aqueous phase with the organic extracting phase of the second cycle.

3. The process of claim 1 wherein the concentration in phosphoric acid of the impure acid is between 20% and 60% by weight of $P_2O_5$.

4. The process of claim 1 or 3 wherein the uranium content of the impure acid is between 30 and 300 mg/l.

5. The process of claim 1 wherein the organic phase of the first cycle contains a cationic extractant for uranium (VI).

6. The process of claim 5 wherein the cationic extractant is at least one member selected from the group consisting of monoalkylphosphoric, dialkylphosphoric, alkylphenylphosphoric, alkylphosphinic, alkylphosphonic and alkylpyrophosphoric acids, wherein the alkyl groups contain 4 to 10 carbon atoms.

7. The process of claim 5 wherein the cationic extractant is di(2-ethylhexyl)phosphoric acid.

8. The process of claim 6 wherein said organic phase further contains a synergistic extraction agent.

9. The process of claim 7 wherein said organic phase further contains a synergistic extraction agent.

10. The process of claim 9 wherein the synergistic extraction agent is thioctylphosphine oxide.

11. The process of claim 1 wherein said organic phase of the first cycle contains an extractant of an anionic character selected from the group consisting of secondary and tertiary amines insoluble in water.

12. The process of claim 1 wherein said organic phase of the first cycle contains an extractant of a neutral character immiscible with water, selected from the group consisting of the trialkyl phosphates.

13. The process of claim 1 wherein said organic phase of the first cycle further contains an organic diluent inert with respect to the extractants selected from the group consisting of aliphatic hydrocarbons, aromatic hydrocarbons, halogenated hydrocarbons and petroleum ethers.

14. The process of claim 10 wherein said organic phase further contains an organic diluent inert with respect to the extractants selected from the group consisting of aliphatic hydrocarbons, aromatic hydrocarbons, halogenated hydrocarbons and petroleum ethers.

15. The process of claim 13 wherein the organic diluent is kerosene.

16. The process of claim 14 wherein the organic diluent is kerosene.

17. The process of claim 14 wherein the concentration in the organic diluent of di-(2-ethylhexyl)phosphoric acid is between about 0.1 and about 2 molar and the concentration of trioctylphosphine oxide is between about 0.01 and about 2 molar.

18. The process of claim 17 wherein the organic diluent is kerosene.

19. The process of claim 1 wherein the uranium concentration in said organic phase of the first cycle is between 20 and 3000 mg per liter.

20. The process of claim 19 wherein the uranium concentration in said organic phase of the first cycle is between 50 and 500 mg per liter.

21. The process of claim 1 wherein the percent by weight of $P_2O_5$ in the aqueous extracting solution is greater than about 28%.

22. The process of claim 1 wherein iron (II) ions are present in the aqueous extracting solution employed in step (ii) of the first cycle in an amount between 0.5 and 100 g per liter of said aqueous extracting solution.

23. The process of claim 1 wherein the process is carried out at a temperature between about 20° and about 80° C.

24. The process of claim 23 wherein the temperature is about 50° C.

25. The process of claim 1 wherein the ratio of the flow rate of the organic extracting phase of the first cycle to the flow rate of the aqueous extracting solution is between 20 and 60.

26. The process of claim 2 wherein the oxidizing agent is hydrogen peroxide.

27. The process of claim 2 wherein the oxidizing agent is air or oxygen.

28. The process of claim 27 wherein the oxidizing agent is under pressure.

29. The process of claim 1 wherein the organic extracting phase of the second cycle is of the same nature as that of the first cycle.

30. The process of claim 16 wherein the organic extracting phase of the second cycle is of the same nature as that of the first cycle.

31. The process of claim 1 wherein the ratio of the flow rate of the aqueous solution of the third cycle to the flow rate of the organic extracting phase of the second cycle is between 0.2 and 3.

32. The process of claim 30 wherein the ratio of the flow rate of the aqueous solution of the third cycle to the flow rate of the organic extracting phase of the second cycle is between 0.2 and 3.

33. The process of claim 1 wherein the amount of iron extracted in the second extracting step of the first cycle by the aqueous solution of the third cycle is equal to the amount extracted from the aqueous solution of the third cycle by the organic extractive phase of the second cycle.

34. The process of claim 1 wherein the ammonium uranyl tricarbonate is separated from the aqueous suspension and the resultant aqueous solution is recycled to the precipitation stage.

35. The process of claim 34 wherein the carbonate and ammonium ion content of the aqueous solution is adjusted prior to its recycling to the precipitation phase.

36. The process of claim 1 wherein the impure phosphoric acid is a raw wet process phosphoric acid.

* * * * *